United States Patent [19]

Huang et al.

[11] Patent Number: 5,540,130
[45] Date of Patent: Jul. 30, 1996

[54] SAW MACHINE

[75] Inventors: Chin-Chun Huang, No. 30-1, Chiu-She Lane, Chiu-She Li., Pei-Tun Dist., Taichung City; Hsiu-Tzu Lin, Nan-Tou, both of Taiwan

[73] Assignee: Chin-Chun Huang, Taichung, Taiwan

[21] Appl. No.: 310,785

[22] Filed: Sep. 27, 1994

[51] Int. Cl.⁶ .................................................. B27B 19/02
[52] U.S. Cl. .................................................. 83/781; 83/783
[58] Field of Search ........................... 83/783, 784, 785, 83/786, 781, 477.1

[56] References Cited

U.S. PATENT DOCUMENTS

| | | | |
|---|---|---|---|
| 76,730 | 4/1868 | Demming | 83/781 |
| 4,599,927 | 7/1986 | Eccardt et al. | 83/477.1 |
| 5,228,376 | 7/1993 | Huang | 83/786 |
| 5,267,498 | 12/1993 | Miyamoto et al. | 83/783 |
| 5,327,807 | 7/1994 | Chang | 83/783 |

*Primary Examiner*—Kenneth E. Peterson
*Attorney, Agent, or Firm*—Jacobson, Price, Holman & Stern, PLLC

[57] ABSTRACT

A saw machine includes a base body with rear and front portions. A worktable extends from the rear portion toward the front portion, and has a sawing slot formed therethrough. An upright support arm has an intermediate section pivoted to the rear portion of the base body. An upper hollow arm extends above the front portion of the base body from an upper section of the support arm. A lower hollow arm extends below the front portion of the base body from a lower section of the support arm. A pair of upper and lower levers have rear ends pivoted respectively in the upper and lower hollow arms, and front ends aligned with each other to define cooperatively a straight line that passes through the sawing slot. An elongated saw blade has two ends connected to the front ends of the upper and lower levers so as to pass through the sawing slot. An angle-adjusting assembly is connected to the lower hollow arm for turning the lower and upper hollow arms and the upright support arm simultaneously to adjust an inclined position of the saw blade. A driving assembly is disposed adjacent and is connected to the front end of the lower lever to reciprocate the lower lever, thereby moving the saw blade along the straight line.

4 Claims, 9 Drawing Sheets

SAW MACHINE

BACKGROUND OF THE INVENTION

1. Field of the Invention

This invention relate to a sawing machine, more particularly to an improved sawing machine which has a driving assembly that is mounted on a base body of the sawing machine adjacent to a sawing blade of the sawing machine so as to facilitate actuation of the saw blade.

2. Description of the Related Art

The improvement of this invention is directed to a conventional sawing machine, as shown in FIG. 1, which includes a base body 11, a worktable 12, a pair of upper and lower hollow arms (13a, 13b), a driving assembly 14, and a saw blade 15.

The base body 11 has a rear portion, a front portion, and a hollow support body 111 mounted to the rear portion of the base body 11. The worktable 12 is supported by the base body 11 and has a top working surface 121 which extends horizontally above the front portion of the base body 11 and on which a workpiece (not shown) can be supported. A sawing slot 122 is formed through the worktable 12. The upper hollow arm (13a) is located above the worktable 12 and has a rear end that is fixed to an upper section of the support body 111 and a front end that extends toward the front portion of the base body 11. The lower hollow arm (13b) is located below the worktable 12 and has a rear end that is fixed to a lower section of the support body 111 and a front end that extends toward the front portion of the base body 11. The driving assembly 14 is mounted within the support body 111. A pair of upper and lower levers (not shown) are mounted respectively and pivotally within the upper and lower hollow arms (13a, 13b). The upper lever has a rear end driven by the driving assembly 14 in a known manner, and a front end extending toward the front end of the upper hollow arm (13a). The lower lever has a rear end driven by the driving assembly 14 in a known manner, and a front end extending toward the front end of the lower hollow arm (13b). The saw blade 15 passes through the sawing slot 122 of the worktable 12 and has two ends which are mounted respectively to the front ends of the upper and lower levers.

When the rear ends of the upper and lower levers are driven by the driving assembly 14, the upper and lower levers can move reciprocatingly and synchronously within the upper and lower hollow arms (13a, 13b) so as to reciprocate the saw blade 15 to cut a workpiece on the worktable 12.

Owing to a longer distance between the saw blade 15 and the driving assembly 14, the saw blade 15 can be driven only indirectly by the driving assembly 14 via the upper and lower levers. The above described transmission system, accordingly, is not the most economical way to actuate effectively the saw blade 15 to cut the workpiece.

Referring to FIG. 2, the conventional sawing machine further includes an adjustment rod 16 which is provided at the front portion of the base body 11 below the worktable 12 in order to incline the worktable 12 to a suitable angle in a known manner, thereby adjusting the inclined position of the working surface 121 of the worktable 12 so that a beveled cut can be made on the workpiece.

Instead of the workpiece, the worktable 12 is moved and is inclined in the conventional sawing machine. This creates a disadvantage in that the workpiece tends to slide downward from the inclined worktable 12 due to gravity. Thus, the workpiece has to be held in a desired position by an operator, thereby causing difficulties and inconveniences during operation and even adverse effects on the accuracy of the cutting lines or cutting surfaces.

SUMMARY OF THE INVENTION

Therefore, the main objective of this invention is to provide an improved sawing machine which has a driving assembly mounted to a position adjacent to a saw blade thereof in order to actuate effectively and economically the saw blade.

Another objective of this invention is to provide an improved sawing machine which has an angle-adjusting assembly that can adjust a saw blade of the improved sawing machine to an inclined position relative to a top working surface of a worktable of the improved sawing machine so as to form conveniently and accurately a bevel on the workpiece.

According to this invention, a sawing machine of this invention includes a base body, a worktable, an upright support arm, upper and lower hollow arms, upper and lower levers, an elongated saw blade, an angle-adjusting assembly, and a driving assembly. The base body has a rear portion and a front portion. The worktable is supported by the base body and has a top working surface which extends horizontally from the rear portion toward the front portion of the base body. A sawing slot is formed through the worktable. The upright support arm has an upper section, a lower section, and an intermediate section mounted pivotally to the rear portion of the base body. The upper hollow arm extends above the worktable and has a rear end portion which is fixed to the upper section of the support arm, and a front end portion which extends toward the front portion of the base body above the worktable. The lower hollow arm extends below the worktable and has a rear end portion which is fixed to the lower section of the support arm, and a front end portion which extends toward the front portion of the base body below the worktable. The upper lever has a rear end mounted pivotally in the upper hollow arm and a front end provided with an upper saw-blade mounting member. The lower lever has a rear end mounted pivotally in the lower hollow arm and a front end provided with a lower saw-blade mounting member. The upper and lower saw-blade mounting members are aligned with each other and define cooperatively a straight line which passes through the sawing slot of the worktable. The elongated saw blade has two ends connected respectively to the upper and lower saw-blade mounting members so as to extend along the straight line and so as to pass through the sawing slot. The driving assembly is disposed adjacent and is connected to the front end of the lower lever to reciprocate the lower lever so as to move reciprocatingly the saw blade along the straight line. The angle-adjusting assembly is mounted to the base body and is connected to the lower hollow arm for turning the lower and upper hollow arms, as well as the upright support arm, simultaneously so as to adjust an inclined position of the saw blade relative to the top working surface of the worktable.

The driving assembly includes a support plate, a motor, a speed reduction gear assembly and a crank member. The support plate is coupled with the front end portion of the lower hollow arm. The motor is installed on the support plate and has an output shaft. The speed reduction gear assembly is connected to the motor and is drivable by the motor. The speed reduction gear assembly has a driving gear mounted fixedly and coaxially on the output shaft of the motor, and a driven gear which is driven by the driving gear and which has an eccentric shaft that extends axially therefrom. The crank member has a lower end mounted on the eccentric shaft of the driven gear, and an upper end connected to the front end of the lower lever to reciprocate the lower lever and the saw blade. The support plate has a slide portion which is connected to the angle-adjusting assembly and which is movable by actuation of the angle-adjusting assembly. Movement of the support plate moves correspondingly the upper and lower hollow arms so as to adjust the saw blade in the inclined position.

The angle-adjusting assembly is mounted on the front portion of the base body and includes a guide plate and a moving unit. The guide plate is mounted securely on the front portion of the base body in front of the slide portion of the support plate, and has a front side, a rear side which contacts face to face the slide portion of the support plate, and an arcuate slot formed therethrough. The moving unit is located at the front side of the guide plate and has an adjustment threaded rod which is mounted rotatably to the guide plate and an adjustment block which is sleeved around the adjustment threaded rod so as to be driven by the latter. The angle-adjusting assembly further includes means for connecting the adjustment block so as to the slide portion of the support plate via the arcuate slot of the guide plate so as to slide the slide portion of the support plate along the arcuate slot of the guide plate when the adjustment threaded rod is operated rotatably, thereby moving the support plate and the lower hollow arm along an arcuate path defined by the arcuate slot. A stabilizing protrusion projects from the slide portion of the support plate into the arcuate slot of the guide plate for guiding the slide portion to move stably on the guide plate. The connecting means includes a slide plate which is located at the front side of the guide plate. The slide plate has an end portion pivoted to the adjustment block and another end portion connected pivotally to the stabilizing protrusion so as to push the stabilizing protrusion to slide along the arcuate slot by virtue of the movement of the adjustment block on the adjustment threaded rod. The connecting means further includes a retaining plate located between the slide plate of the connecting means and the front side of the guide plate and coupled with the stabilizing protrusion of the support plate. The retaining plate has a width larger than a height of the arcuate slot so as to contact face to face with the front side of the guide plate at a peripheral portion thereof, thereby preventing removal of the stabilizing protrusion from the arcuate slot of the guide plate. A rotary handle is mounted securely on one end of the adjustment threaded rod and is located at an exterior of the base body so as to facilitate rotation of the adjustment threaded rod.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
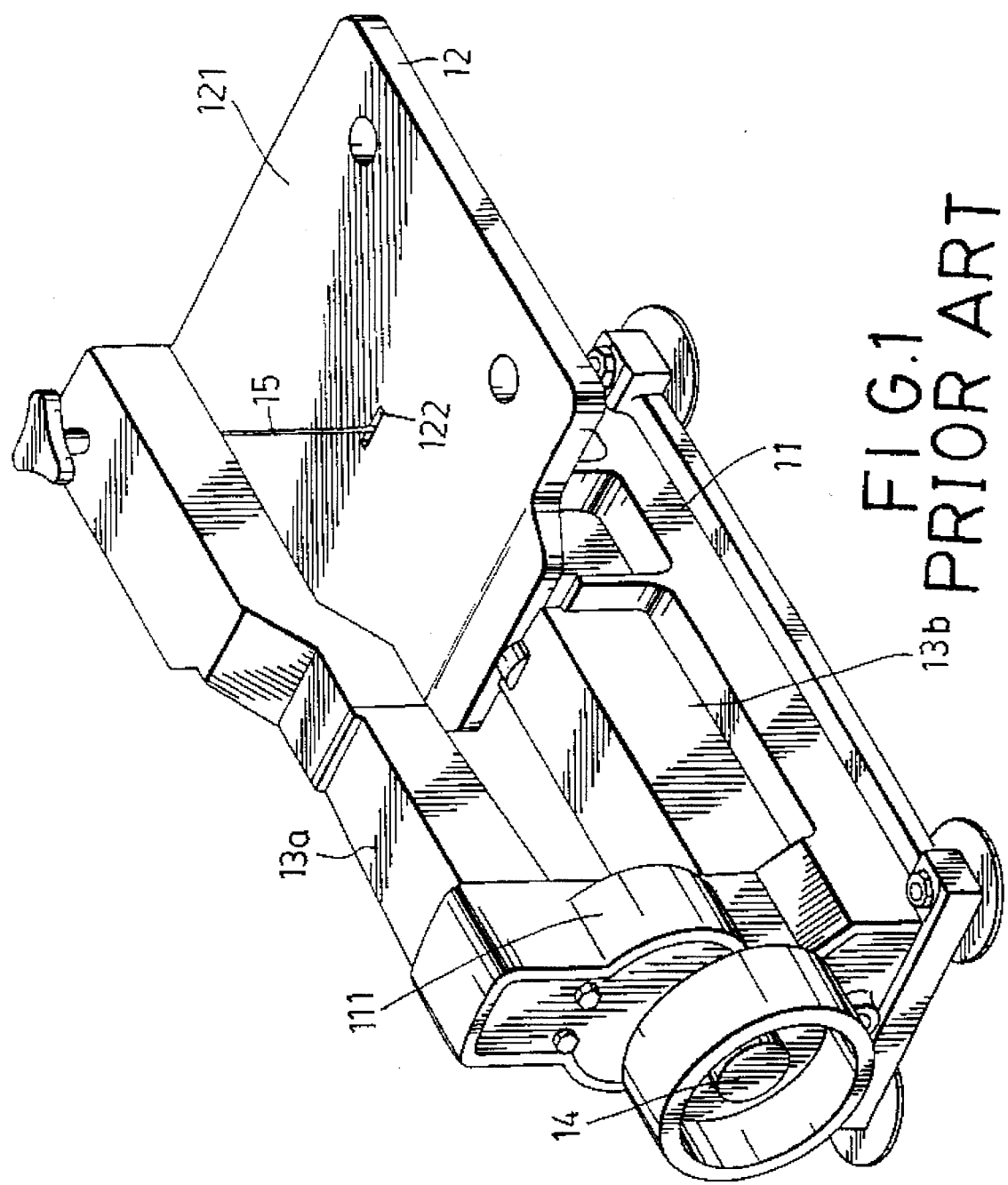
FIG. 1 is a perspective view of a conventional sawing machine.
Figure 2:
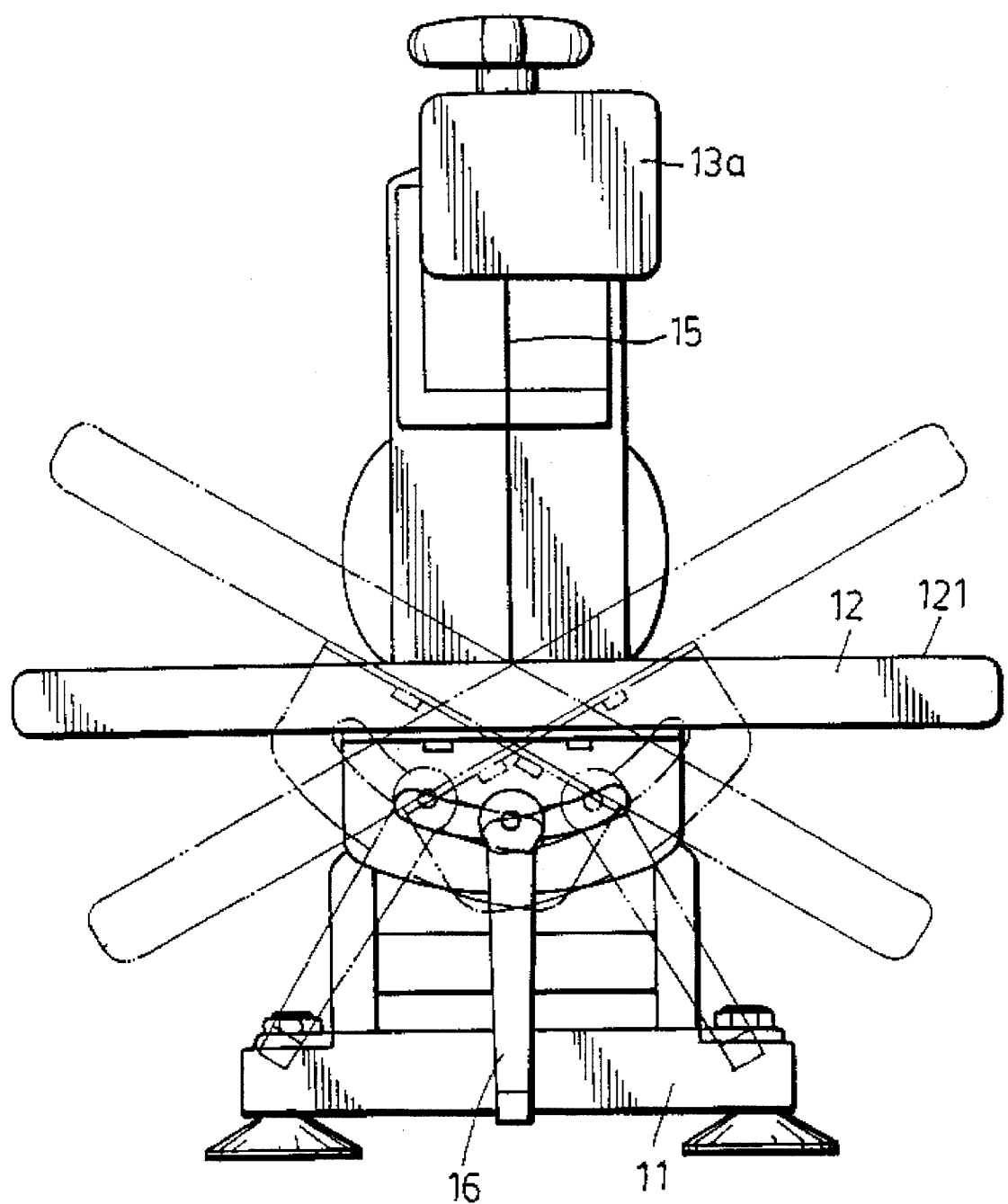
FIG. 2 is a schematic view illustrating how a worktable of the conventional sawing machine is adjusted to an inclined position.
Figure 3:
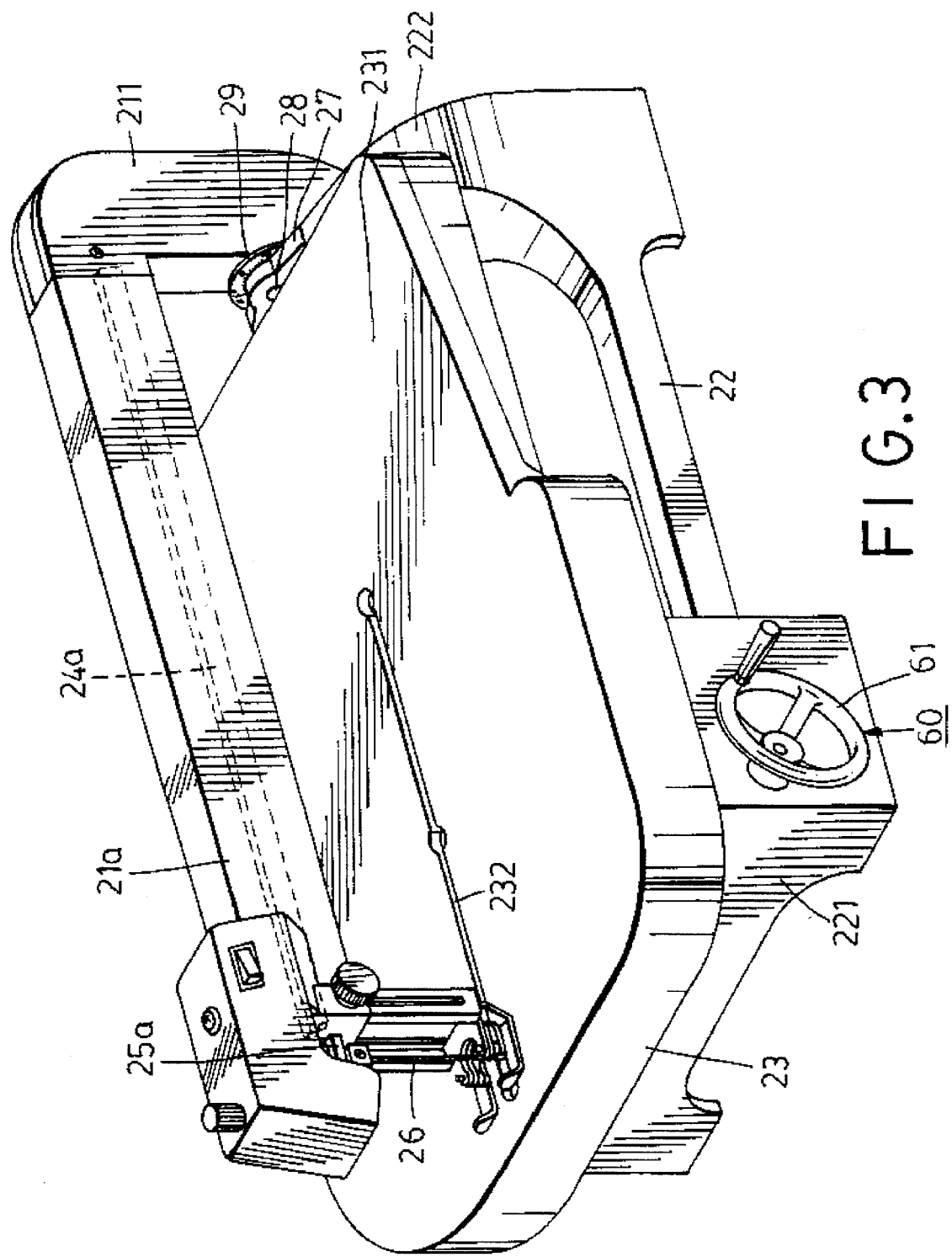
FIG. 3 is a perspective view showing a sawing machine according to a preferred embodiment of this invention.
Figure 4:
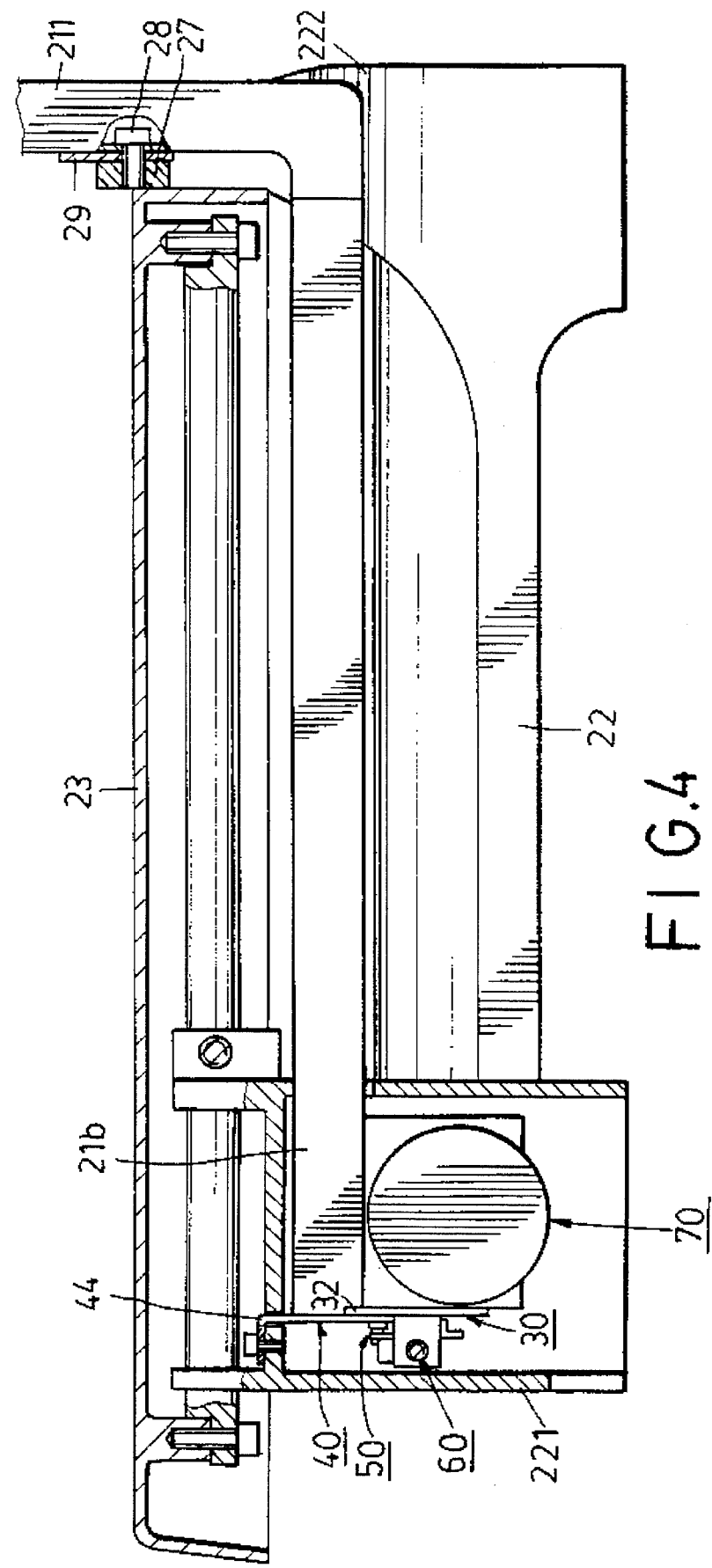
FIG. 4 is a partially sectional view showing the sawing machine of the preferred embodiment of this invention.

Referring to FIG. 3, a preferred embodiment of the sawing machine of this invention includes a base body 22, a worktable 23, an upright support arm 211, upper and lower hollow arms (21a, 21b) (see FIG. 6), upper and lower levers (24a, 24b) (see FIG. 6), an elongated saw blade 26, an angle-adjusting assembly, and a driving assembly 70 (see FIG. 4).

The base body 22 has a rear portion 222 and a front portion 221. The rear portion 222 has an upwardly extending pivot arm 27.

The worktable 23 is supported by the base body 22 and has a top working surface 231 which extends horizontally from the rear portion 222 toward the front portion 221 of the base body 22. A sawing slot 232 is formed through the worktable 23.

The upright support arm 211 has an upper section, a lower section, and an intermediate section mounted pivotally to the pivot arm 27 of the rear portion 222 of the base body 22 by means of a pivot pin 28. A curved angle-measuring member 29 is positioned between the pivot arm 27 and the upright support arm 211 so as to enable an operator to determine an inclined angle of the support arm 211 relative to the working surface 231 of the worktable 23.

The upper hollow arm (21a) extends above the worktable 23 and has a rear end portion which is fixed to the upper section of the support arm 211 and a front end portion which extends toward the front portion of the base body 22 above the worktable 23.

The lower hollow arm (21b), as shown in FIG. 4, extends below the worktable 23 and has a rear end portion which is fixed to the lower section of the support arm 211 and a front end portion which extends toward the front portion of the base body 22 below the worktable 23.

Referring again to FIG. 3, the upper lever (24a) has a rear end which is mounted pivotally to the rear end portion of the upper hollow arm (21a), and a front end which extends toward the front end portion of the upper hollow arm (21a) and which is provided with an upper saw-blade mounting member (25a).

Figure 7:
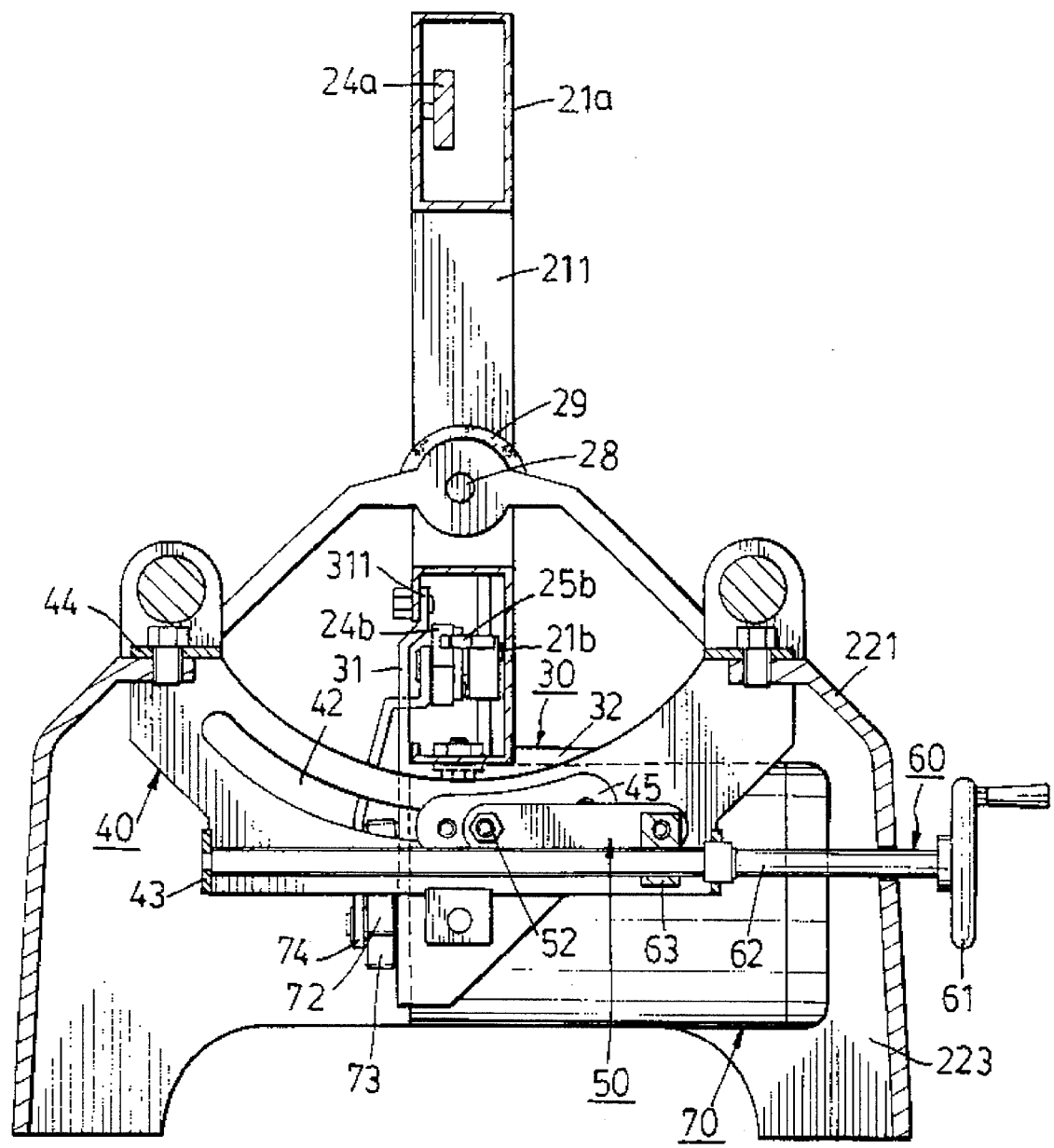
FIG. 7 is a schematic view illustrating the combination of the angle-adjusting assembly and the driving assembly of the sawing machine in accordance with the preferred embodiment of this invention.

The lower lever (24b), as shown in FIG. 7, has a rear end (not shown) which is mounted pivotally to the rear end portion of the lower hollow arm (21b), and a front end which extends toward to the front end portion of the lower hollow arm (21b) and which is provided with a lower saw-blade mounting member (25b). The upper and lower saw-blade mounting members (25a, 25b) are aligned with each other and define cooperatively a straight line which passes through the sawing slot 232 of the worktable 23, as shown in FIG. 3.

The elongated saw blade 26 has two ends connected respectively to the upper and lower saw-blade mounting members (25a, 25b) so as to extend along the straight line and so as to pass through the sawing slot 232 of the worktable 23.

Figure 6:
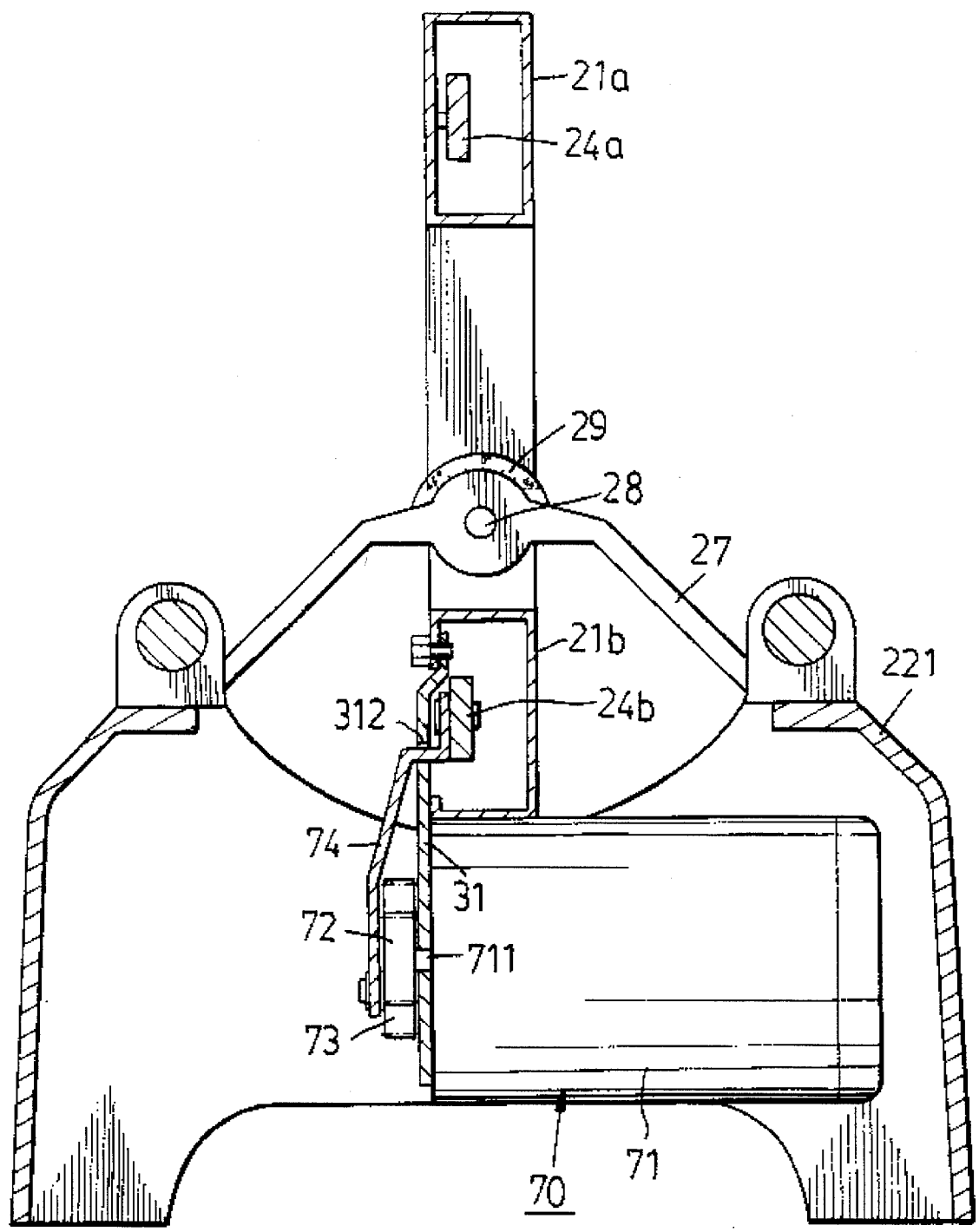
FIG. 6 is a sectional view showing the driving assembly of the sawing machine according to this invention.

Referring to FIGS. 4 and 6, the driving assembly 70 is disposed adjacent and is connected to the front end of the lower lever (24b) to reciprocate the lower lever (24b) so as to move reciprocatingly the saw blade 26 (see FIG. 3) along the straight line defined by the upper and lower saw-blade mounting members (25a, 25b).

Figure 9:
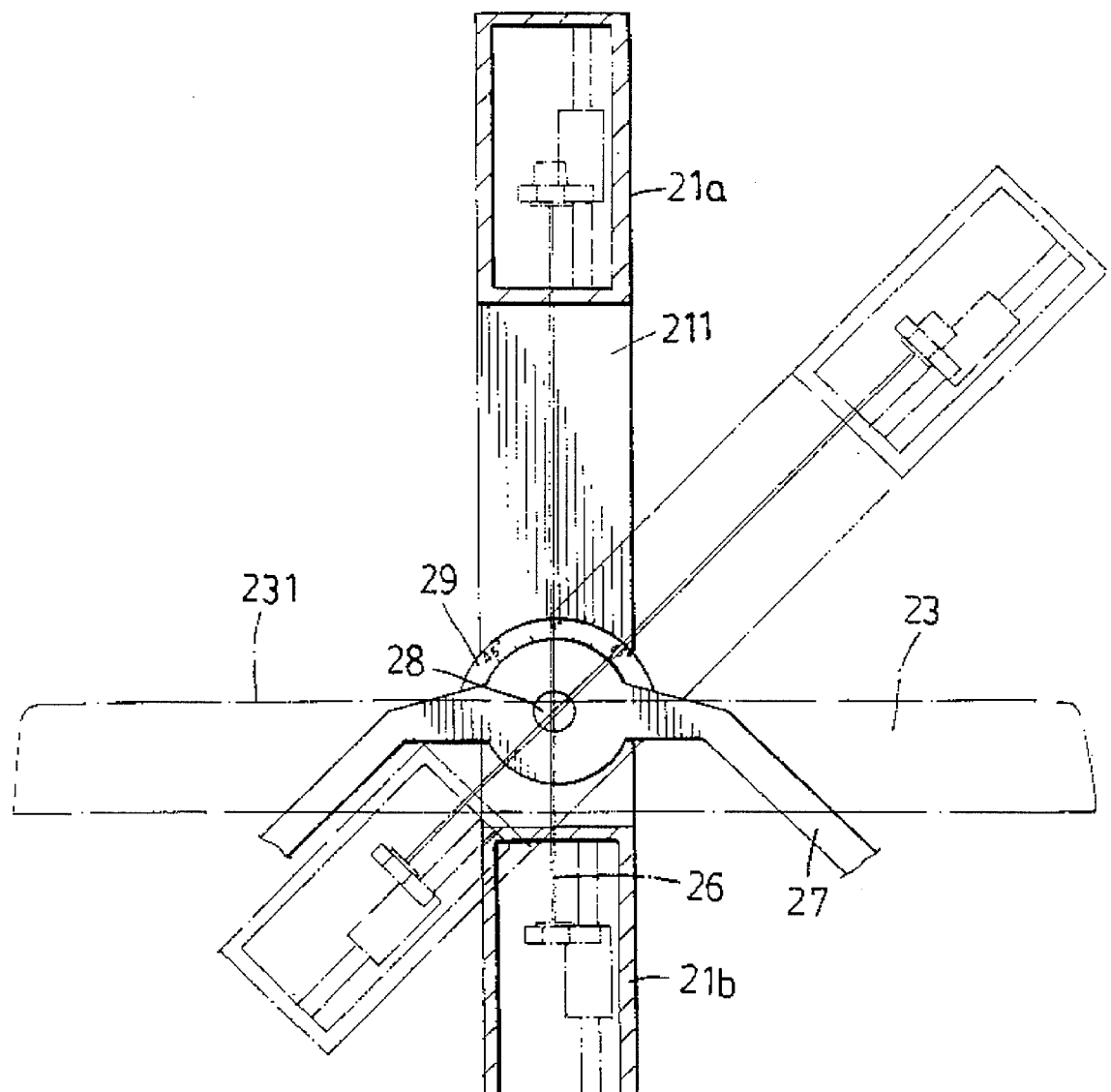
FIG. 9 is a schematic view illustrating how a saw blade of the sawing machine is adjusted to an inclined position relative to a worktable of the sawing machine in accordance with the preferred embodiment of this invention.

The angle-adjusting assembly includes a guide plate 40 and a moving unit 60 (see FIG. 4) which are mounted to the front portion of the base body 22 and is connected to the lower hollow arm (21b) for turning the lower and upper hollow arms (21b, 21a), as well as the upright support arm 211, simultaneously so as to adjust an inclined position of the saw blade 26 relative to the top working surface 231, as shown in FIG. 9.

Figure 5:
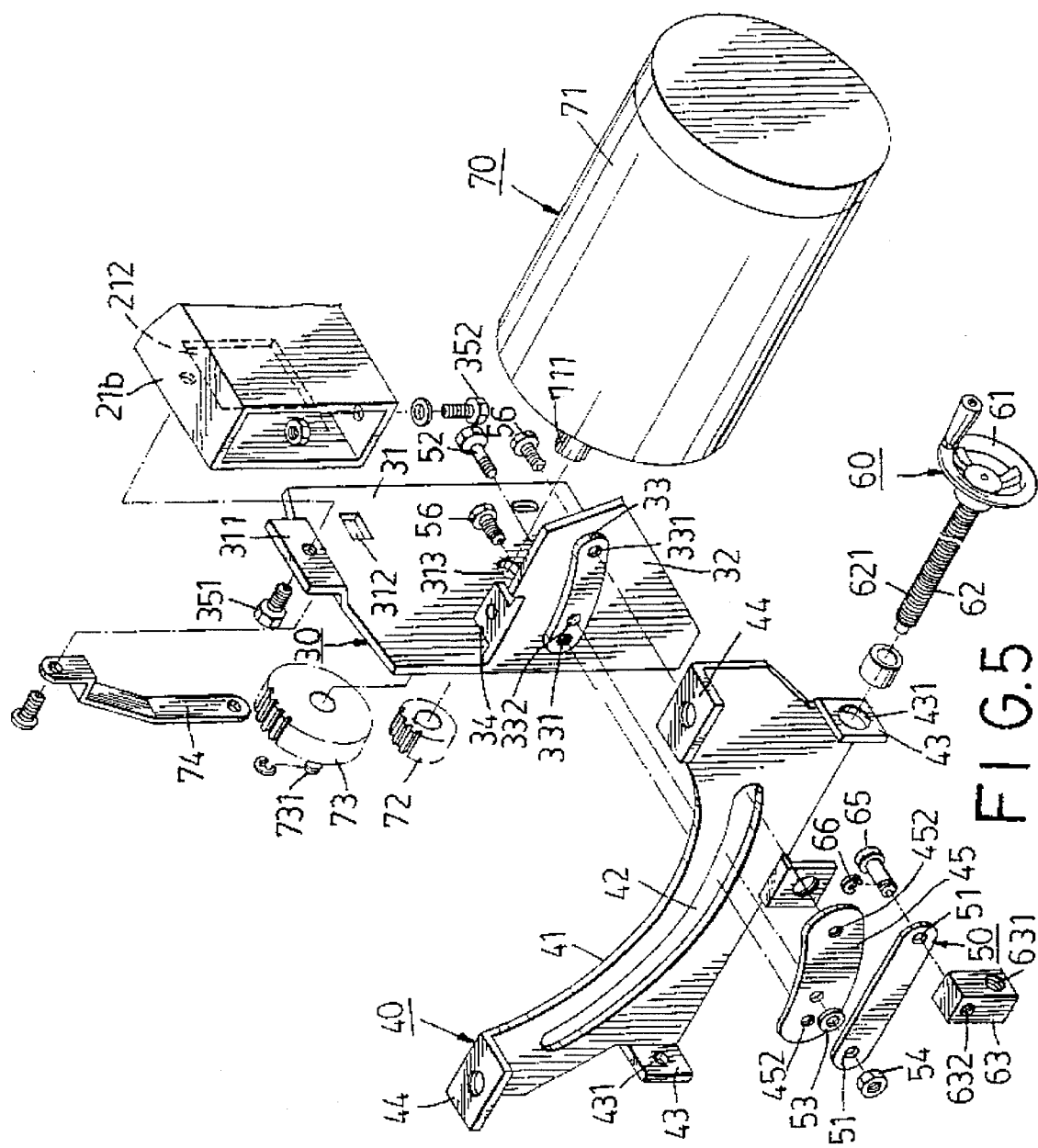
FIG. 5 is an exploded view showing a driving assembly and an angle-adjusting assembly of the sawing machine of this invention.

Referring to FIGS. 5 and 7, the driving assembly 70 includes a support plate 30, a motor 71, a speed reduction gear assembly, and a crank member 74. The support plate 30 has a support portion 31 and a slide portion 32 which extends vertically from a side edge of the support portion 31.

The support portion 31 of the support plate 30 has a passage 312 formed therethrough, a hole 313 formed therethrough below the passage 312, and an upwardly extending positioning plate 311 coupled with one of the side walls of the front end portion of the lower hollow arm (21b) by means of a bolt 351 so as to fix the lower hollow arm (21b) on the support plate 30. The motor 71 is installed on the support plate 30 and has an output shaft 711 which extends through the hole 313 of the support portion 31. The speed reduction gear assembly has a driving gear 72 mounted fixedly and coaxially on the output shaft 711 of the motor 71, and a driven gear 73 which is mounted pivotally on the outer side of the support portion 31 and which meshes with the driving gear 72 so as to be driven by the latter. Accordingly, the speed reduction gear assembly is connected to the motor 71 and is drivable by the same. The driven gear 73 has an eccentric shaft 731 which extends axially therefrom. The crank member 74 has a lower end which is sleeved on the eccentric shaft 731 of the driven gear 73, and an upper end which extends through the passage 312 of the support portion 31 and through an opening 212 of the lower hollow arm (21b) so as to be connected to the front end of the lower lever (24b). The crank member 74 is drivable indirectly by the motor 71 via the speed reduction gear assembly to reciprocate the lower lever (24b).

Because the front end of the lower lever (24b) is provided with the lower saw-blade mounting member (25b), the reciprocation of the lower lever (24b) can actuate the lower saw-blade mounting member (25b) so as to reciprocate the saw blade 26 (see FIG. 3). Owing to its being connected directly to the lower saw-blade mounting member (25b), the driving assembly 70 can drive effectively the saw blade 26 in a simple and economical way.

The slide portion 32 of the support plate 30 has a horizontal plate 34 (see FIG. 5) extending rearwards from a top end thereof for bearing the lower hollow arm (21b) thereon. By extending a bolt 352 through the horizontal plate 34 and the bottom wall of the lower hollow arm (21b), the lower hollow arm (21b) can be fixed on the support plate 30. The support plate 30 further has a stabilizing protrusion 33 projecting from a front surface of the slide portion 32, two threaded holes 331 formed through the stabilizing protrusion 33 and the slide portion 32 at two end portions of the stabilizing protrusion 33, and a pivot hole 332 formed through the stabilizing protrusion 33 and the slide portion 32 between the threaded holes 331. The slide portion 32 of the support plate 30 is connected to the angle-adjusting assembly and is movable by actuation of the angle-adjusting assembly. Movement of the support plate 30 moves correspondingly the upper and lower hollow arms (21a, 21b) as well as the upright support arm 211 so as to adjust the saw blade 26 in the inclined position. The connection between the support plate 30 and the angle-adjusting assembly and the actuation of the angle-adjusting assembly will be described in the following paragraphs.

The guide plate 40 of the angle-adjusting assembly has a front side, a rear side, a curved upper end 41 for allowing the lower hollow arm (21b) to move thereabove (see FIG. 8), and an arcuate slot 42 formed therethrough. The stabilizing protrusion 33 of the support plate 30 extends into the arcuate slot 42 of the guide plate 40 for guiding the support plate 30 to move stably on the guide plate 40 when the support plate 30 is driven by the angle-adjusting assembly. A pair of mounting members 43 are formed on the lower ends of the front side of the guide plate 40 and are spaced apart from each other at a predetermined distance. A pair of forwardly extending positioning plates 44 are formed on the guide plate 40 above the mounting members 43 and are mounted threadably on the top surface of the front portion 221 of the base body 22, as shown in FIGS. 4 and 7, so as to fix the guide plate 40 on the base body 22 in front of the slide portion 32 of the support plate 30. In this way, the rear side of the guide plate 40 can contact face to face the slide portion 32 of the support plate 30.

Referring again to FIGS. 5 and 7, the moving unit 60 of the angle-adjusting assembly includes an adjustment threaded rod 62 with two ends which engage rotatably two holes 431 in the mounting members 43 of the guide plate 40, and an adjustment block 63 with an inward threaded portion 631 engaging movably an outwardly threaded portion 621 of the adjustment threaded rod 62 when the adjustment block 63 is sleeved around the adjustment threaded rod 62. Accordingly, when the adjustment threaded rod 62 is rotated, the adjustment block 63 can be moved along the adjustment threaded rod 62. The moving unit 60 further includes a rotary handle 61 which is mounted securely on one end of the adjustment threaded rod 62 and which is located at an exterior of the front portion 221 of the base body 22 (see FIG. 7) so as to facilitate rotation of the adjustment threaded rod 62.

The angle-adjusting assembly further includes means for connecting the adjustment block 63 to the slide portion 32 of the support plate 30 via the arcuate slot 42 of the guide plate 40 so as to slide the stabilizing protrusion 33 of the slide portion 32 along the arcuate slot 42 when the adjustment threaded rod 62 is operated rotatably, thereby moving the support plate 30 and the lower hollow arm (21b) along an arcuate path which is defined by the arcuate slot 42.

The connecting means includes a slide plate 50 which is located at the front side of the guide plate 40 and which has two pivot holes 51 formed in two end portions thereof. The slide plate 50 is mounted pivotally to the adjustment block 63 by extending a pivot pin 65 through the right one of the pivot holes 51 of the slide plate 50 and through a hole 632 of the adjustment block 63. Then, a lock element 66 is sleeved on a distal end of the pivot pin 65 so as to lock the pivot pin 65. A pivot bolt 52 extends through the pivot hole 332 of the support plate 30 and through the left one of the pivot holes 51 of the slide plate 50, and is locked on the slide plate 50 by means of a threaded nut 54 so as to connect pivotally the stabilizing protrusion 33 to the slide plate 50. Accordingly, the slide plate 50 can push the stabilizing protrusion 33 to slide along the arcuate slot 42 of the guide plate 40 by virtue of the movement of the adjustment nut 63 on the adjustment threaded rod 62. The connecting means further includes a retaining plate 45 which is located between the slide plate 50 and the front side of the guide plate 40 and which is coupled with the stabilizing protrusion 33 of the support plate 30 by means of two bolts 56, each of which extends through a respective one of the threaded holes 331 of the support plate 30 and through a respective one of two spaced threaded holes 452 of the retaining plate 45. The retaining plate 45 has a width larger than a height of the arcuate slot 42 so as to contact face to face with the front side of the guide plate 40 at a peripheral portion thereof, thereby preventing removal of the stabilizing protrusion 33 from the arcuate slot 42 of the guide plate 40. A washer 53 is sleeved around the pivot bolt 52 between the retaining plate 45 and the slide plate 50 so as to avoid excess friction between the retaining plate 45 and the slide plate 50 when the angle-adjusting assembly is in use.

Figure 8:
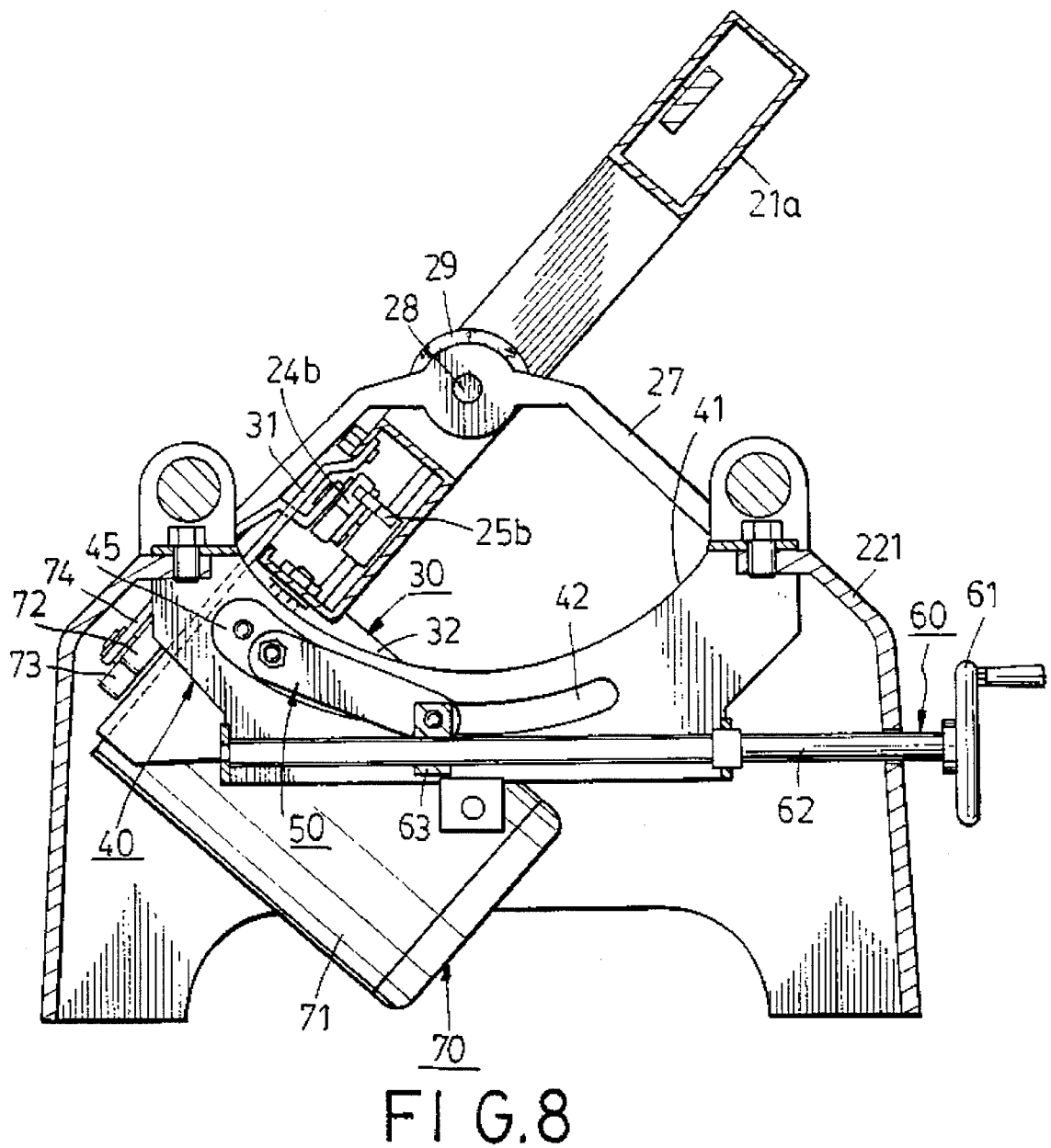
FIG. 8 is a schematic view illustrating the operation of the angle-adjusting assembly of the sawing machine in accordance with the preferred embodiment of this invention.

Referring to FIGS. 8 and 9, when the adjustment block 63 is moved along the adjustment threaded rod 62, the slide plate 50 can slide the stabilizing protrusion 33 of the support plate 30 along the arcuate slot 42 of the guide plate 40 so as to move the support plate 30 on the guide plate 40 along the arcuate path which is defined by the arcuate slot 42. Movement of the support plate 30 moves the lower hollow arm (21b) and the upper hollow arm (21a), as well as the support arm 211, along the arcuate path in order to place the saw blade 26 in an inclined position relative to the top working surface 231 of the worktable 23, as shown in FIG. 9. In this way, when the saw blade 26 is actuated to cut the workpiece, a bevel can be formed on the workpiece. Preferably, the angle-measuring member 29 can facilitate observing of the inclined angle of the saw blade 26.

With the provision of the angle-adjusting assembly to adjust the inclined position of the saw blade 26, the worktable 23 of this invention does not have to be moved and inclined in order to adjust the inclined position of the working surface 231. Thus, the workpiece can be supported stably on the working surface 231 of the worktable 23 without the risk of downward sliding.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:
1. A saw machine comprising:
a base body having a rear portion and a front portion;
a worktable supported by said base body and having a top working surface which extends horizontally from said rear portion toward said front portion of said base body, said worktable having a sawing slot formed therethrough;
an upright support arm having an upper section, a lower section, and an intermediate section mounted pivotally to said rear portion of said base body;
an upper hollow arm extending above said worktable and having a rear end portion which is fixed to said upper section of said support arm, and a front end portion which extends toward said front portion of said base body above said worktable;
a lower hollow arm extending below said worktable and having a rear end portion which is fixed to said lower section of said support arm, and a front end portion which extends toward said front portion of said base body below said worktable;
an upper lever having a rear end mounted pivotally in said upper hollow arm and a front end provided with an upper saw-blade mounting member;
a lower lever having a rear end mounted pivotally in said lower hollow arm and a front end provided with a lower saw-blade mounting member, said upper and lower saw-blade mounting members being aligned with each other and defining cooperatively a straight line which passes through said sawing slot of said worktable;
an elongated saw blade having two ends connected respectively to said upper and lower saw-blade mounting members so as to extend along said straight line and so as to pass through said sawing slot;
an angle-adjusting assembly mounted to said base body and connected to said lower hollow arm for turning said lower and upper hollow arms and said upright support arm simultaneously to adjust an inclined position of said saw blade; and
a driving assembly disposed adjacent and connected to said front end of said lower lever to reciprocate said lower lever so as to move reciprocatingly said saw blade along said straight line, wherein:
said driving assembly includes:
a support plate coupled with said front end portion of said lower hollow arm;
a motor installed on said support plate and having an output shaft;
a speed reduction gear assembly connected to said motor and drivable by said motor, said speed reduction gear assembly having a driving gear mounted fixedly and coaxially on said output shaft, and a driven gear which is driven by said driving gear and which has an eccentric shaft that extends axially therefrom; and
a crank member having a lower end mounted on said eccentric shaft and an upper end connected to said front end of said lower lever to reciprocate said lower lever as well as said saw blade
and wherein said support plate has a slide portion which is connected to said angle-adjusting assembly and which is movable by actuation of said angle-adjusting assembly, movement of said support plate moving correspondingly said upper and lower hollow arms so as to adjust said inclined position of said saw blade, said angle-adjusting assembly being mounted on said front portion of said base body and including:
a guide plate mounted securely on said front portion of said base body in front of said slide portion of said support plate, said guide plate having a front side, a rear side which contacts face to face with said slide portion of said support plate, and an arcuate slot formed therethrough;
a moving unit located at said front side of said guide plate and having an adjustment threaded rod which is mounted rotatably to said guide plate and an adjustment block which is sleeved around said adjustment threaded rod so as to be driven by said adjustment threaded rod; and means for connecting said adjustment block to said slide portion of said support plate via said arcuate slot of said guide plate so as to slide said slide portion of said support plate along said arcuate slot when said adjustment threaded rod is operated rotatably, thereby moving said support plate and said lower hollow arm along said arcuate path.

2. A saw machine as claimed in claim 1, wherein said support plate has a stabilizing protrusion which projects from said slide portion of said support plate into said arcuate slot of said guide plate for guiding said slide portion to move stably on said guide plate, said connecting means including a slide plate which is located at said front side of said guide plate, said slide plate having an end portion pivoted to said adjustment block and another end portion connected pivotally to said stabilizing protrusion so as to push said stabilizing protrusion to slide along said arcuate slot by virtue of movement of said adjustment block on said adjustment threaded rod.

3. A saw machine as claimed in claim 2, wherein said connecting means further includes a retaining plate located between said slide plate of said connecting means and said front side of said guide plate and coupled with said stabilizing protrusion of said support plate, said retaining plate having a width larger than a height of said arcuate slot so as to contact face to face with said front side of said guide plate at a peripheral portion thereof, thereby preventing removal of said stabilizing protrusion from said arcuate slot of said guide plate.

4. A saw machine as claimed in claim 1, wherein said moving unit further has a rotary handle which is mounted securely on one end of said adjustment threaded rod and which is located at an exterior of said base body so as to facilitate rotation of said adjustment threaded rod.

* * * * *